United States Patent [19]
Peterson et al.

[11] Patent Number: 6,085,310
[45] Date of Patent: Jul. 4, 2000

[54] METHOD AND APPARATUS FOR PERFORMING AN OPERATION MULTIPLE TIMES IN RESPONSE TO A SINGLE INSTRUCTION

[75] Inventors: James Peterson, Portland, Oreg.; Glenn C. Poole, Fremont; Mohammed Sriti, Milpitas, both of Calif.

[73] Assignee: Micron Technology, Inc., Boise, Id.

[21] Appl. No.: 08/987,290

[22] Filed: Dec. 9, 1997

Related U.S. Application Data

[62] Division of application No. 08/616,563, Mar. 15, 1996, Pat. No. 5,761,524.

[51] Int. Cl.[7] .............................. G06F 9/44; G06F 9/302

[52] U.S. Cl. ............................. 712/41; 712/42; 712/36; 345/522

[58] Field of Search ..................................... 710/129, 131; 709/400; 712/21, 23, 205, 215–226, 248, 41, 42, 36; 714/6, 5; 399/93.08, 188; 711/113, 114; 345/508, 502, 426, 501; 702/50; 348/17.15

[56] References Cited

U.S. PATENT DOCUMENTS

| | | | |
|---|---|---|---|
| 4,766,566 | 8/1988 | Chuang | 712/23 |
| 5,278,975 | 1/1994 | Ishihata et al. . | |
| 5,293,587 | 3/1994 | Deb et al. | 345/508 |
| 5,345,541 | 9/1994 | Kelley et al. | 345/426 |
| 5,428,810 | 6/1995 | Barkans et al. | 712/42 |
| 5,440,747 | 8/1995 | Kiuchi . | |
| 5,481,683 | 1/1996 | Karim . | |
| 5,517,603 | 5/1996 | Kelley et al. . | |
| 5,594,671 | 1/1997 | Chen et al. | 702/50 |

*Primary Examiner*—Daniel H. Pan
*Attorney, Agent, or Firm*—Blakely, Sokoloff, Taylor & Zafman LLP

[57] ABSTRACT

A method for operating a Reduced Instruction Set Computer (RISC) processor that executes mormal RISC instructions and special RISC instructions. The method comprises the step of controlling the RISC processor to perform a single operation, using a single functional unit for each RISC processor, in response to each normal RISC instruction. The method also comprises the step of controlling the RISC processor to perform multiple operations, using multiple functional units of the RISC processor in parallel, in response to each special RISC instruction.

6 Claims, 10 Drawing Sheets

METHOD AND APPARATUS FOR PERFORMING AN OPERATION MULTIPLE TIMES IN RESPONSE TO A SINGLE INSTRUCTION

RELATED APPLICATIONS

This is a divisional of application Ser. No. 08/616,563 filed on Mar. 15, 1996, now U.S. Pat. No. 5,761,524.

FIELD OF THE INVENTION

The present invention relates generally to processors and more particularly to a processor capable of performing an operation multiple times in response to a single instruction.

BACKGROUND

Many modern computer systems such as graphics workstations and personal computers (PCs) include specialized graphics subsystems for rendering two-dimensional and three-dimensional graphical objects on a display device such as a cathode ray tube (CRT), a plasma flat-panel, or a liquid crystal display (LCD). The use of a graphics subsystem allows for increased system performance because graphics operations once handled by the host processor of the computer system can be performed by the graphics subsystem concurrently (in parallel) with other operations performed by the host processor. Furthermore, graphics subsystems, which are often provided with specialized hardware and software, typically render graphical objects more quickly.

The amount of graphics processing that the graphics subsystem itself performs determines, to a large extent, the increase in both system performance and graphics processing performance. For example, one prior graphics subsystem merely includes a frame buffer memory and associated control hardware, and the general purpose host processor must still perform the majority of the graphics processing functions. Such an approach is inefficient because the host processor must transfer a relatively large amount of data to the frame buffer, which prevents other system components and subsystems from concurrently using the system interconnect. Another prior graphics subsystem includes a specialized graphics processor that operates in parallel with the host processor and performs all of the required graphic processing functions, but such an approach may be cost-prohibitive for some users.

A balance between the two extreme approaches is needed to provide improved system performance and graphics processing performance at a reasonable cost. One proposed system requires the host processor to perform some initial graphics processing steps after which a graphics controller performs the remaining graphics processing steps. Such a division of labor allows the amount of data exchanged between the host processor and the graphics subsystem to be reduced, which improves the overall system performance when compared to the "dumb" graphics subsystems of the prior art. In order to increase graphics processing performance, the graphics controller should be provided with performance enhancing features that increase the speed at which graphical objects are rendered, but such performance enhancing features should be provided at a relatively low cost.

One area wherein graphics processing performance may be increased is in the interpolation of output primitives. To efficiently store graphics data, application programs provide and use output primitives that represent graphical objects wherein each output primitive provides a minimum of information from which the complete information regarding a graphical object may be implied or interpolated. For example, one type of output primitive is a triangle that specifies the position (in a two-dimensional Cartesian coordinate space, or x versus y) and the attributes (including z and color attributes such as r, g, and b) of three vertices, and the position and attributes of every point within the triangle can be interpolated from the provided values for the vertices. Other types of output primitives include points, straight lines, curved lines, circles, triangles and other polygons, triangle strips, and triangle fans.

The process of interpolation for filled area polygons such as triangles typically comprises the following steps: 1) set up; 2) edge walking; and 3) span generation. During set up, delta values for each of the pixel parameters (e.g., the position and attributes) are calculated based on the pixel parameter values for the vertices of the output primitive. The delta values are then used to perform edge walking wherein the pixel parameters for pixels on the non-horizontal edges (ie., edges having a non-zero slope) of the polygon are calculated by incrementing the delta values. Once the edges of the polygon have been determined, span generation occurs wherein the pixel parameters for pixels located in the horizontal scan lines between the edges of the polygon are calculated. In this manner, the pixel parameters for each pixel in a polygon may be calculated from an output primitive. The step of span generation is particularly amenable to modification to improve performance. For example, the y value for each of the pixels in the span remains fixed.

SUMMARY AND OBJECTS OF THE INVENTION

Therefore, it is an object of the present invention to improve the processing speed of a processor.

It is another object of the present invention to improve the processing speed of a processor when generating a span to interpolate an output primitive during graphics processing.

These and other objects of the invention are provided by a method for operating a Reduced Instruction Set Computer (RISC) processor that executes normal RISC instructions and special RISC instructions. The method comprises the step of controlling the RISC processor to perform a single operation, using a single functional unit of the RISC processor, in response to each normal RISC instruction. The method also comprises the step of controlling the RISC processor to perform multiple operations, using multiple functional units of the RISC processor in parallel, in response to each special RISC instruction.

According to one embodiment, a type of special RISC instruction is a draw instruction for interpolating an output primitive wherein the RISC processor processes multiple pixel parameters for a single pixel. By using multiple functional units, the RISC processor effectively executes multiple normal RISC instructions in parallel, thus increasing processing speed when interpolating an output primitive.

According to another embodiment, the RISC processor is also capable of processing a special "repeated" RISC instruction wherein the RISC processor is controlled to repeatedly perform multiple operations using multiple functional units of the RISC processor in parallel wherein, after a first operation, each subsequent operation depends on a result of a previous operation in response to each special repeated RISC instruction. A type of special repeated RISC instruction is a repeated draw instruction for interpolating an output primitive wherein the RISC processor processes a series of pixel parameters for a span of pixels in response to the repeated draw instruction. The repeated draw instruction may be used to generate an entire span of pixels with one RISC instruction.

Other objects, features, and advantages of the present invention will be apparent from the accompanying drawings and from the detailed description which follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A Reduced Instruction Set Computer ("RISC") processor architecture having particular application to span generation is described. In particular, the described RISC processor architecture supports a special "repeated draw" instruction that causes a draw operation to be repeated a particular number of times before the next instruction is fetched, wherein each draw operation after the initial draw operation depends on the results of the previous draw operation. Performing multiple operations by a RISC processor in response to a single instruction improves processing speed when compared to processing a sequence of instructions that would otherwise require performance of the same operation the same number of times. The performance improvement may be understood by recognizing that the "repeated draw" instruction need only be fetched and decoded once in order to perform all of the desired draw operations, wherein each draw instruction of a sequence of draw instructions typically must be separately fetched and decoded.

Additional advantages are found in the manner that the data path of RISC processor architecture is configured and operated. For example, the RISC processor normally operates as a general purpose processor including a plurality of arithmetic units such as multipliers, dividers, and Arithmetic Logic Units (ALUs), wherein a normal instruction specifies a single operation requiring a single arithmetic unit for execution. For special purpose instructions, such as the "repeated draw" instruction, the RISC processor operates as a special purpose processor wherein the special purpose instruction specifies a multiplicity of arithmetic operations that are efficiently executed in parallel by the plurality of arithmetic units. The control and decode logic is configured to support both general and special purpose instructions such that the RISC processor operates both as a general purpose processor for performing general arithmetic and memory operations and as a special purpose processor for efficiently performing specialized operations.

The "repeated draw" instruction is useful to generate spans when filling a polygon specified by an output primitive because 1) the need to perform a sequence of draw operations is predictable once the distance between the edges of the polygon for a particular scan line is known, and 2) the span generation process requires that the pixel parameters for each pixel of a scan line be incremented by the same set of delta values. Other applications of "repeated" instructions may be found wherever a reasonable degree of predictability in the instruction stream exists.

System Overview

Figure 1:
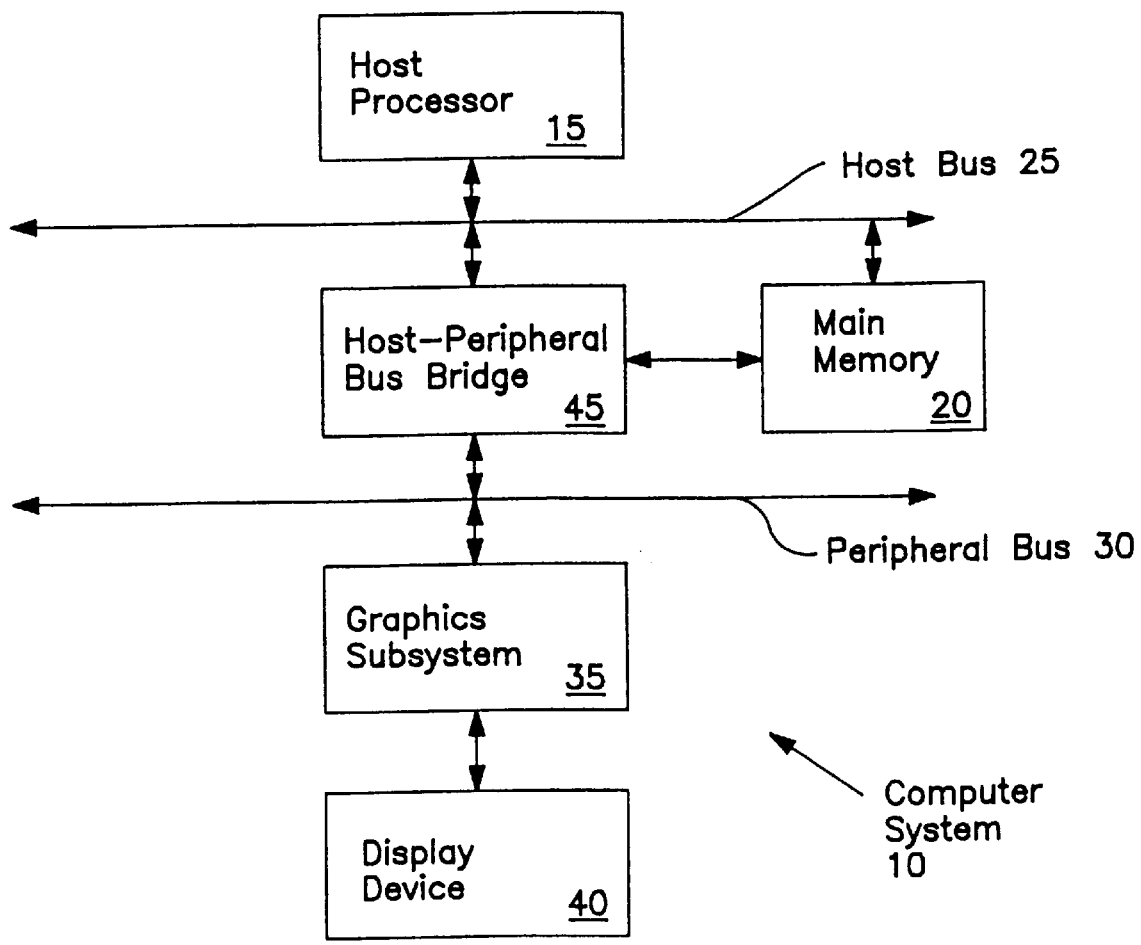
FIG. 1 shows a computer system of one embodiment.

FIG. 1 shows a computer system 10 that includes a host processor 15 and a main memory 20 coupled to a host bus 25. The host processor 15 may be, for example, any commercially available microprocessor. Computer system 10 also includes a peripheral bus 30 that, for one embodiment, operates according to the Peripheral Components Interconnect (PCI) Local Bus specification. A graphics subsystem 35 is coupled to the peripheral bus 30, and a host-peripheral bus bridge 45 is coupled to the peripheral bus 30 and the host bus 25 for bridging data transactions between the host and peripheral buses. The host-peripheral bus bridge 45 also operates as a memory controller for controlling main memory 20. Alternative system configurations may be used.

According to the present embodiments, host processor 15 executes an application program (not shown) stored in main memory 20 that requires the display of graphical objects on display device 40. Each graphical object is constructed from a set of one or more output primitives, wherein each output primitive includes a set of values that specify or imply how and where the graphical object represented by the primitive is to be displayed. Types of output primitives include points, straight lines, curved lines, circles, triangles and other polygons, triangle strips, and triangle fans.

The positions of graphical objects and their component primitives are initially specified by the application program in terms of a Cartesian reference frame called world coordinates. In order for the graphical object to be displayed, a coordinate transformation is required to express the graphical objects and their component primitives in terms of the device coordinate space of the display. Once the output primitives have been transformed to device coordinates, the output primitives may be interpolated and otherwise processed to generate pixel values for display.

According to the present embodiments, the host processor 15 receives the output primitives in world coordinates, transforms the output primitives to device coordinates, performs lighting effect processing, and transmits the transformed output primitives to graphics subsystem 35, which interpolates the output primitives and generates the final pixel values for display. Because the host processor 15 does not perform the actual pixel processing, bus traffic is significantly reduced, and the host processor is freed to perform other tasks. This division of labor between the host processor 15 and the graphics subsystem 35 therefore provides for a significant increase in concurrency (parallelism) when compared to systems wherein the host processor performs the majority of graphics processing tasks.

Figure 2:
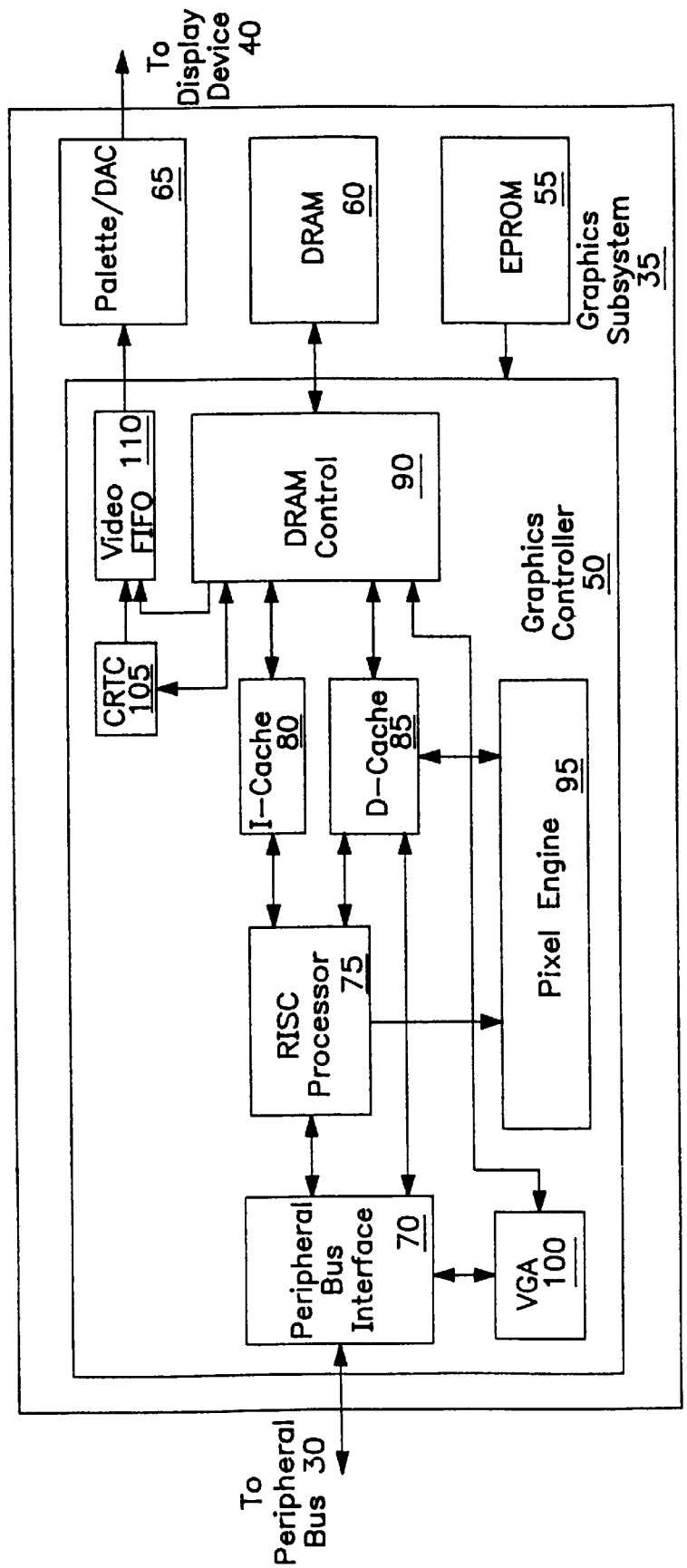
FIG. 2 shows a graphics subsystem of one embodiment.

FIG. 2 shows the graphics subsystem 35 as generally comprising a graphics controller 50, an EPROM 55, DRAM 60, and palette/DAC 65. Graphics controller 50 is coupled to the peripheral bus 30 to receive the transformed output primitives from the host processor 15, whereupon graphics controller 50 performs the appropriate interpolation and processing to generate pixel values for display. DRAM 60 is partitioned into a frame buffer memory that stores pixel values for display and a texture map memory that stores texture maps. Palette/DAC 65 includes a digital-to-analog converter that transforms the digital pixel values into analog voltages for manipulating display device 40.

Graphics controller 50 is shown as including a peripheral bus interface 70, a RISC processor 75, an instruction cache (I-cache) 80, a data cache (D-cache) 85, a DRAM controller 90, a pixel engine 95, VGA circuitry 100, video controller ("CRTC") 105, and video first-in-first-out (FIFO) memory 110. Peripheral bus interface 70 is provided to couple graphics controller 50 to peripheral bus 30.

Output primitives are transmitted to graphics controller 50 by the host processor 15 as a data stream. Each output primitive includes a type portion specifying the type of output primitive and a data portion specifying the position and attributes of each point or vertex of the primitive. For example, wherein the output primitive is a triangle, the output primitive includes a type portion specifying a triangle and data specifying the positions and attributes of three vertices. The type portion also includes information that specifies the length of the data portion of the output primitive so that RISC processor 75 can determine where in the data stream the next output primitive begins. RISC processor 75 interprets the data stream to determine which instructions to fetch from I-cache 80 in order to correctly process the output primitive.

RISC processor 75 interpolates each output primitive to produce pixel parameters for each pixel to be displayed within the area defined by the output primitive. Pixel engine 95 performs filtering and other processing using the pixel parameters to generate pixel values. Each pixel value corresponds directly with a pixel of the display device and is stored in the frame buffer portion of DRAM 60 by DRAM controller 90. CRTC 105 fetches the pixel values from DRAM 60 to fill video FIFO 110 to refresh on the display device.

Figure 3:
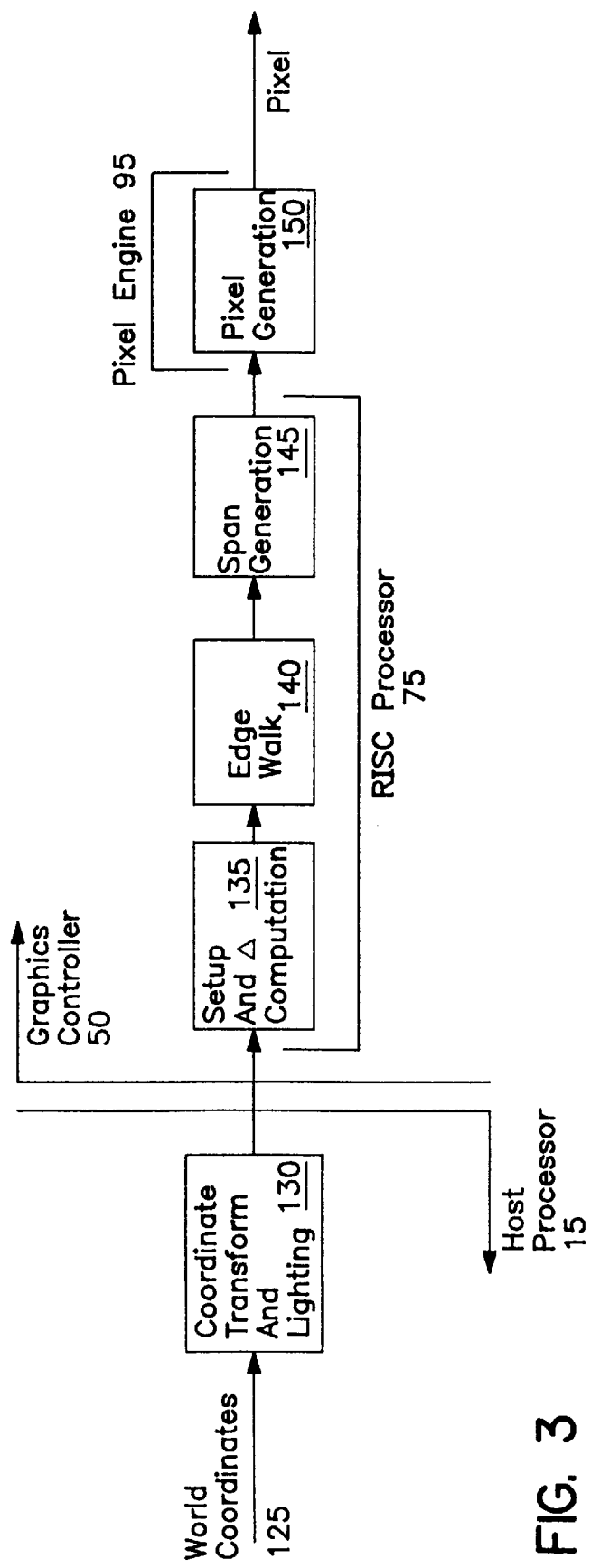
FIG. 3 is flow diagram showing the division of labor between the host and the graphics subsystem according to one embodiment.

FIG. 3 shows the manner in which graphics processing is divided among the host processor 15 and the components of graphics controller 50. Generally, host processor 15 receives output primitives from the application program, wherein the output primitives are specified in world coordinates 125. Host processor 15 performs a coordinate transformation and graphics processing to provide lighting effects (process block 130). The output primitives, now expressed in device coordinates, are transferred to graphics controller 50 by host processor 15. RISC processor 75 interpolates the points or vertices of an output primitive to calculate the position and attributes of intermediate points implied by the output primitive, and pixel engine 95 processes the values for all of the points of the graphical object to produce pixel values that are stored in the frame buffer and subsequently used for display.

At process block 135, RISC processor 75 sets up the interpolation process to fill the area implied by the output primitive. For example, if the output primitive is a triangle, the three vertices of the triangle implies a triangular shape, and the pixel parameters (i.e., position and attributes) for each pixel within the filled triangle may be calculated from the position and attributes of the three vertices. To set up the interpolation process, RISC processor 75 determines delta values (e.g. dx, dy, du, dv, etc.) for each of the specified pixel parameters. During the set up process, RISC processor 75 operates as a typical general purpose RISC processor that processes a sequence of instructions that each specify a single operation requiring a maximum of one arithmetic unit of the processor for execution.

At process block 140, RISC processor 75 uses the delta values to perform an "edge walk" to determine the pixel parameters for the pixels at the edges of the polygon implied by the output primitive. During the edge walk process, RISC processor 75 operates as a typical general purpose RISC processor.

At process block 145, RISC processor 75 uses the delta values and the calculated edges to generate "spans" of pixel parameters for the pixels between the calculated edges. During the span generation process, RISC processor 75 operates as a special purpose processor wherein the RISC processor processes one or more "draw" instructions that each result in the output of the pixel parameters for a pixel of a span. RISC processor 75 may alternatively perform a single "repeated draw" instruction that specifies a sequence of draw operations for each of the pixels of a span. For each "draw" instruction and each draw operation of the "repeated draw" instruction, RISC processor 75 performs multiple arithmetic operations in parallel using multiple arithmetic units. At process block 150, pixel engine 95 uses the pixel parameters calculated by RISC processor 75 to generate pixel values that are used to excite the appropriate pixel of the display device.

Graphics Subsystem—The Processor

Figure 4:
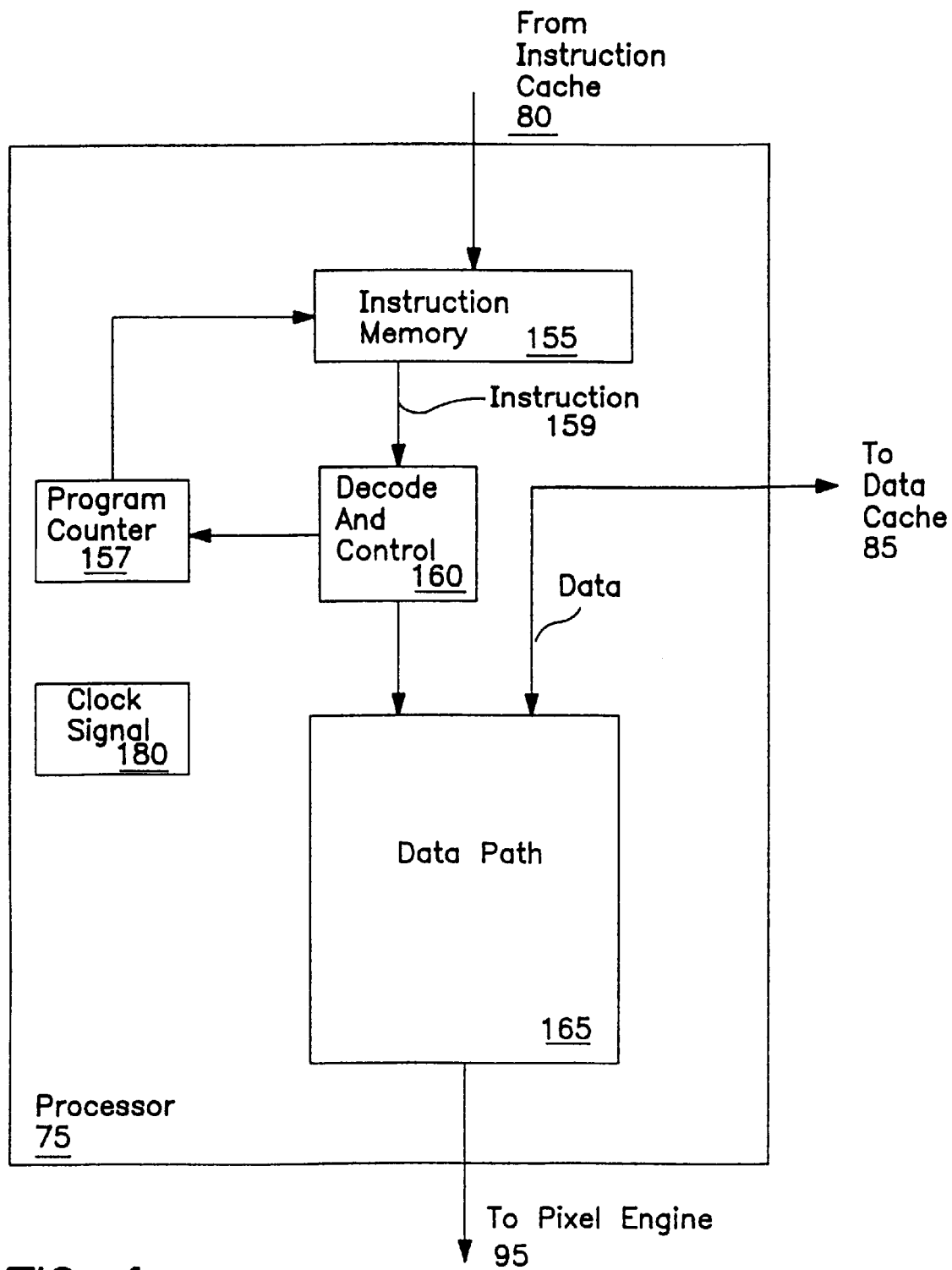
FIG. 4 is a block diagram showing a RISC processor of one embodiment.

FIG. 4 shows RISC processor 75 as including instruction memory 155, program counter 157, decode and control unit 160, and data path 165 all of which are clocked by clock signal 180, which may be provided internally or externally to RISC processor 75. For most applications, RISC processor 75 operates as a typical pipelined processor that performs one operation per instruction. Accordingly, data path 165 includes a multiplicity of functional units for performing arithmetic and logical operations. (See FIG. 8 for an example of one embodiment of data path 165).

Additionally, RISC processor 75 is capable of performing a special "draw" instruction that comprises a multiplicity of operations performed simultaneously in parallel by the functional units of data path 165 wherein decode and control unit 160 includes logic for generating the appropriate control signals to manipulate the functional units of the data path. Data path 165 is configured to efficiently execute a "draw" instruction such that RISC processor 75 operates like a special purpose span generator.

RISC processor 75 can also execute a special "repeated" instruction wherein the operation indicated by the "repeated" instruction is performed a specified number of times before the next instruction of the instruction stream is fetched. The repeated instruction may be used instead of a sequence of instructions that each specify the same operation be performed, which reduces the amount of time required to perform the desired operations. For example, a sequence of four "draw" instructions each for drawing a pixel may be replaced with a single "repeated draw" or "rdraw" instruction.

Figure 5:
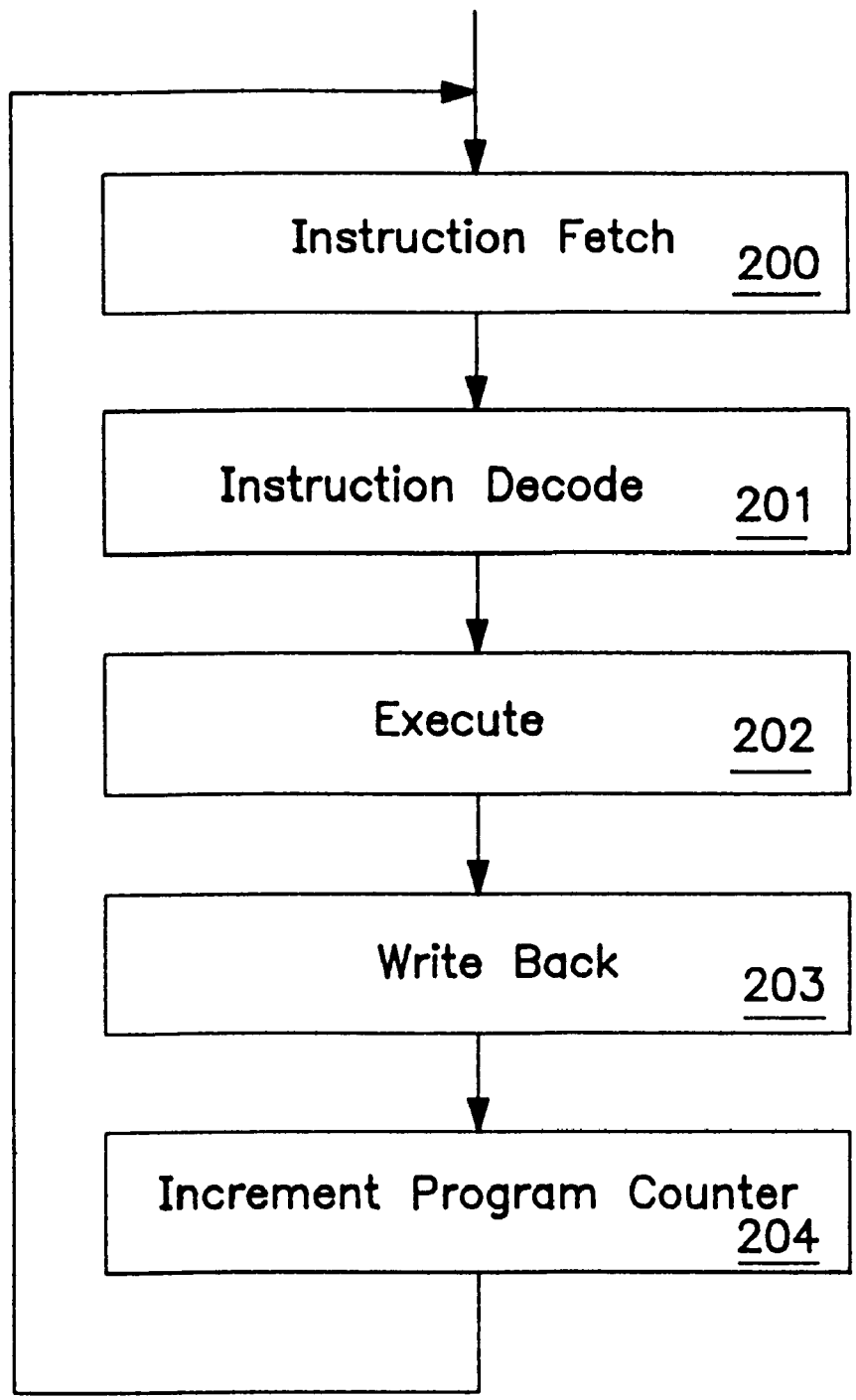
FIG. 5 is a flow chart showing the execution of a normal RISC instruction according to the prior art.
Figure 6:
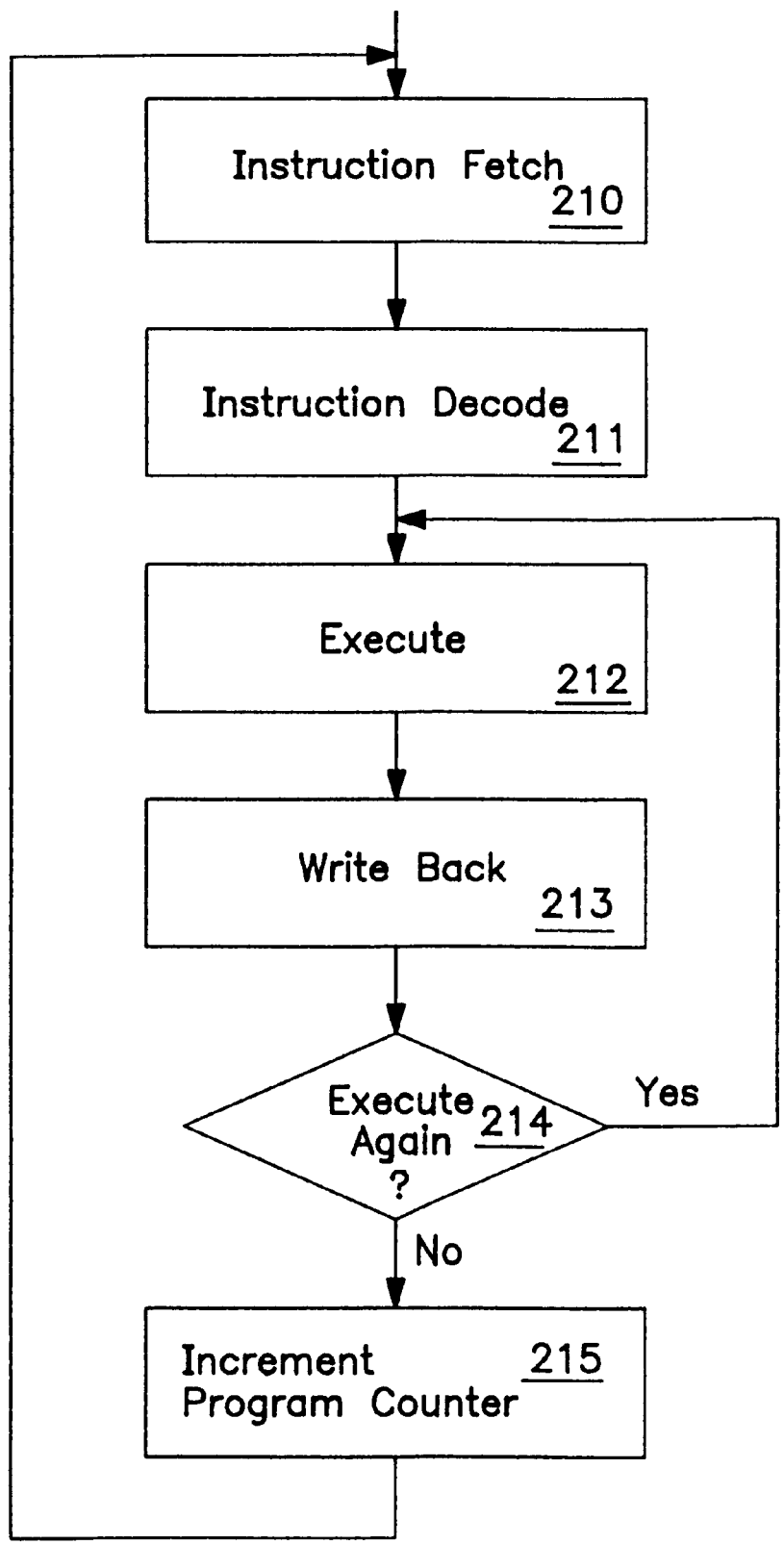
FIG. 6 is a flow chart showing the execution of a special repeated instruction according to one embodiment.

The advantages of the special "repeated" instruction may be understood by comparing prior art FIG. 5 to FIG. 6. FIG. 5 shows the stages of a typical instruction pipeline as comprising an instruction fetch stage 200, an instruction decode stage 201, an execute stage 202, and a write back stage 203. The program counter is incremented at stage 204, which causes the next instruction to be fetched. If each stage of the pipeline takes one clock cycle to complete, each instruction requires five clock cycles to complete. For the sequence of draw instructions, each draw instruction would be subject to each stage of the pipeline.

FIG. 6 shows the manner in which a special "repeated" instruction is performed. Like the pipeline of FIG. 5, the pipeline of FIG. 6 includes an instruction fetch stage 210, an instruction decode stage 211, an execute stage 212, and a write back stage 213, but the program counter is prevented from incrementing if the operation specified by the repeated instruction is to be executed again. The determination of whether the operation is to be performed again may be made concurrently with the write back stage 213 so no latency is added to the pipeline. Because a "repeated" instruction is fetched and decoded only once, time is saved when compared to a sequence of instructions specifying the same operations.

Returning to FIG. 4, the operation of RISC processor 75 will now be discussed. Instruction memory 155 stores instructions retrieved from instruction cache 80. When the program counter 157 is incremented, instruction memory 155 outputs an instruction, which is decoded by decode and control unit 160. Decode and control unit 160 asserts the necessary control signals and loads the appropriate registers of data path 165 such that data path 165 can perform the operation indicated by the instruction.

When a "draw" instruction is received by decode and control unit 160, decode and control unit 160 generates the necessary control signals to manipulate the functional units of the data path 165 such that several functional units perform different operations at the same time. Decode and control unit 160 comprises logic circuitry such as a programmable logic array (PLA) that automatically generates the appropriate control signals in response to the opcode of the draw instruction.

Figure 7:
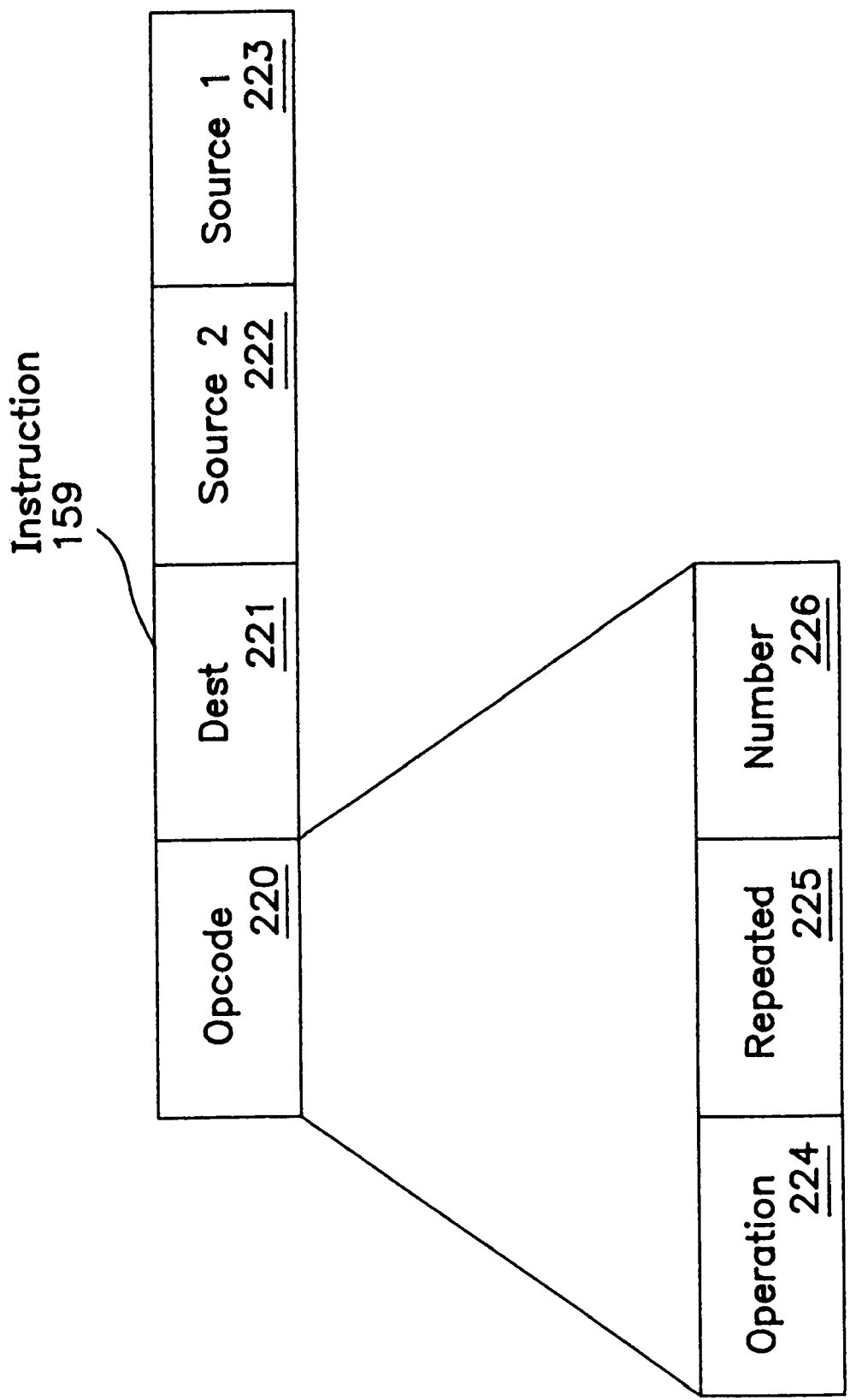
FIG. 7 shows a format for a special repeated instruction according to one embodiment.
Figure 8A:
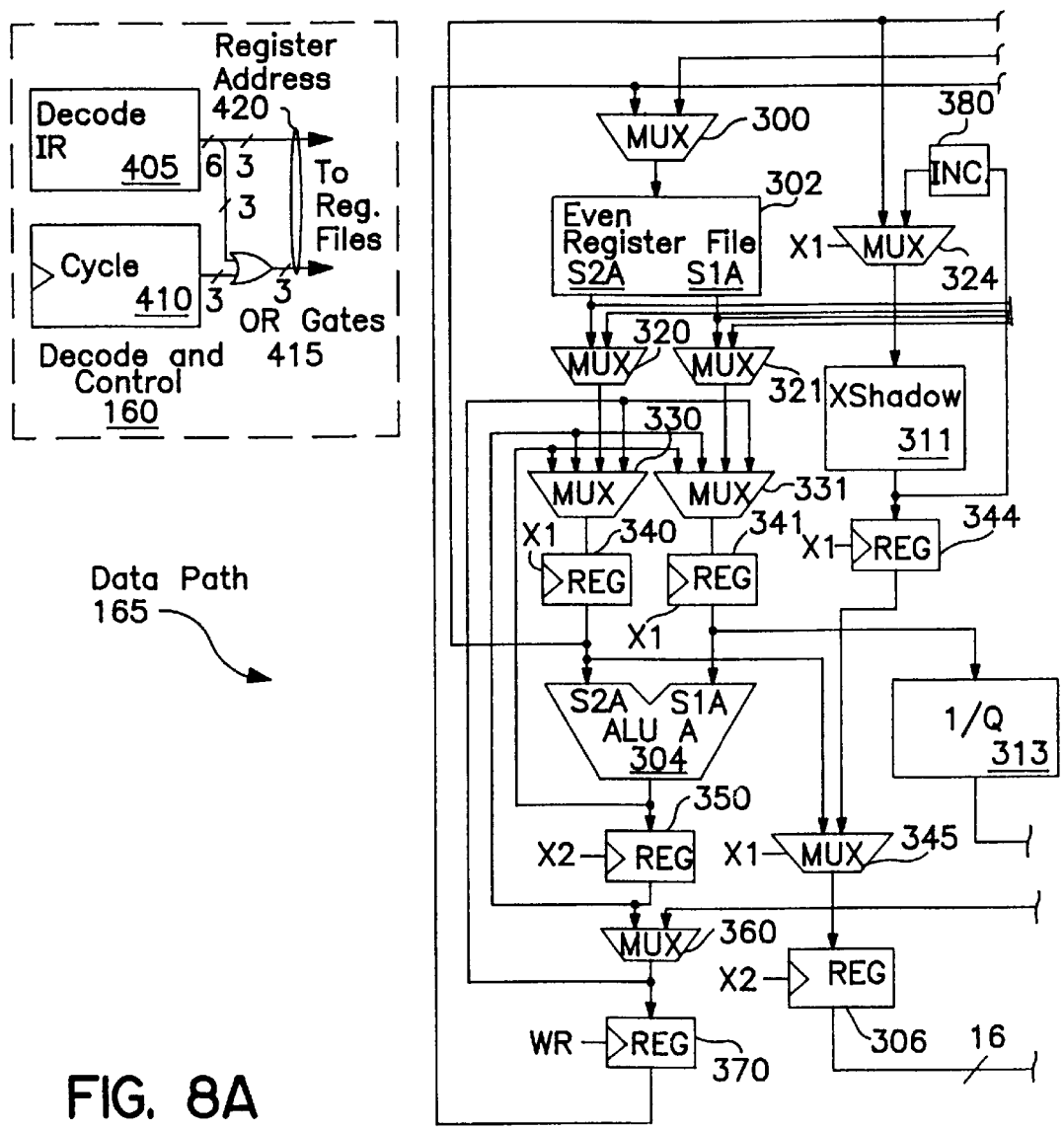
FIG. 8 show a data path of one embodiment.
Figure 8B:
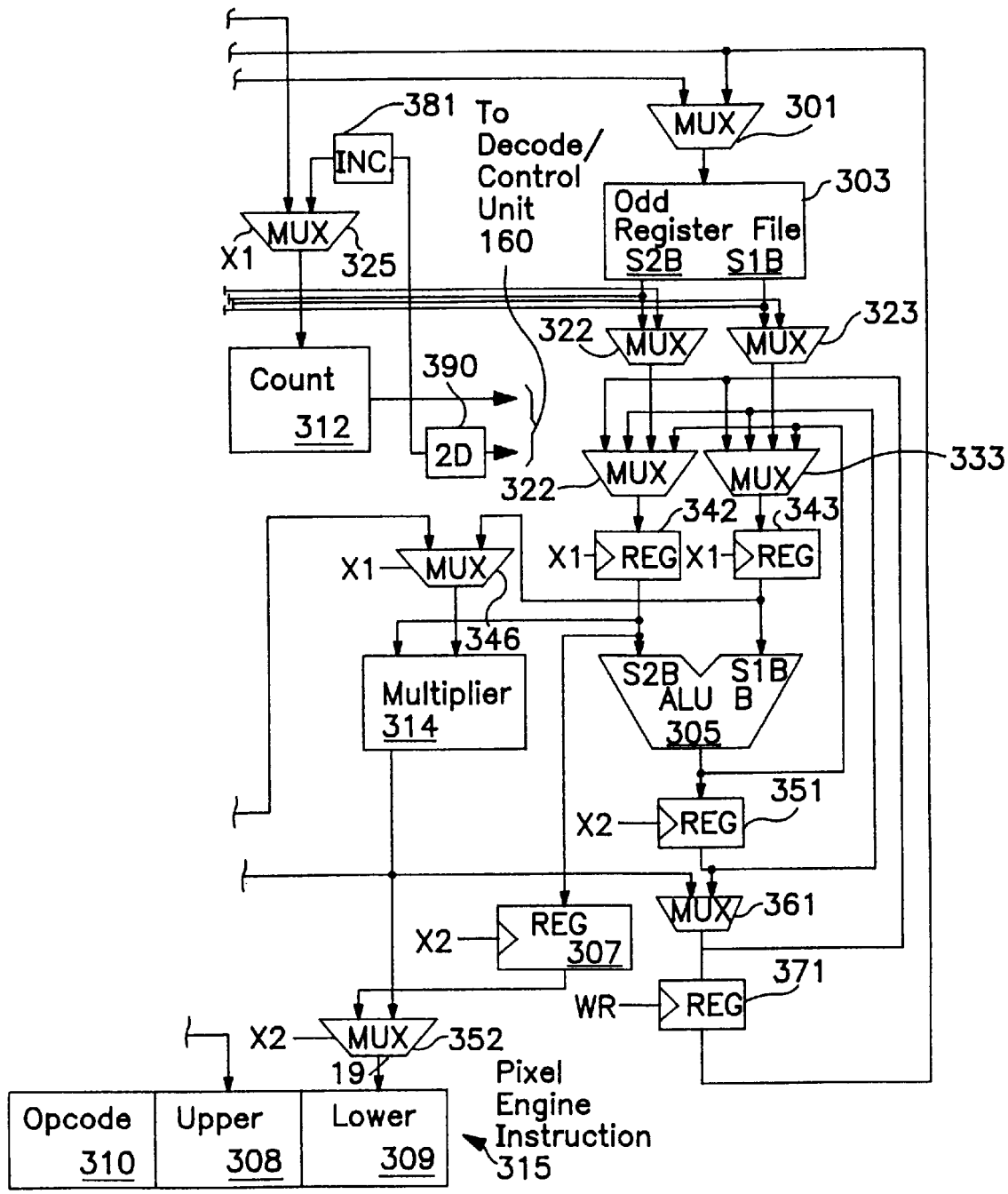
Figure 9:
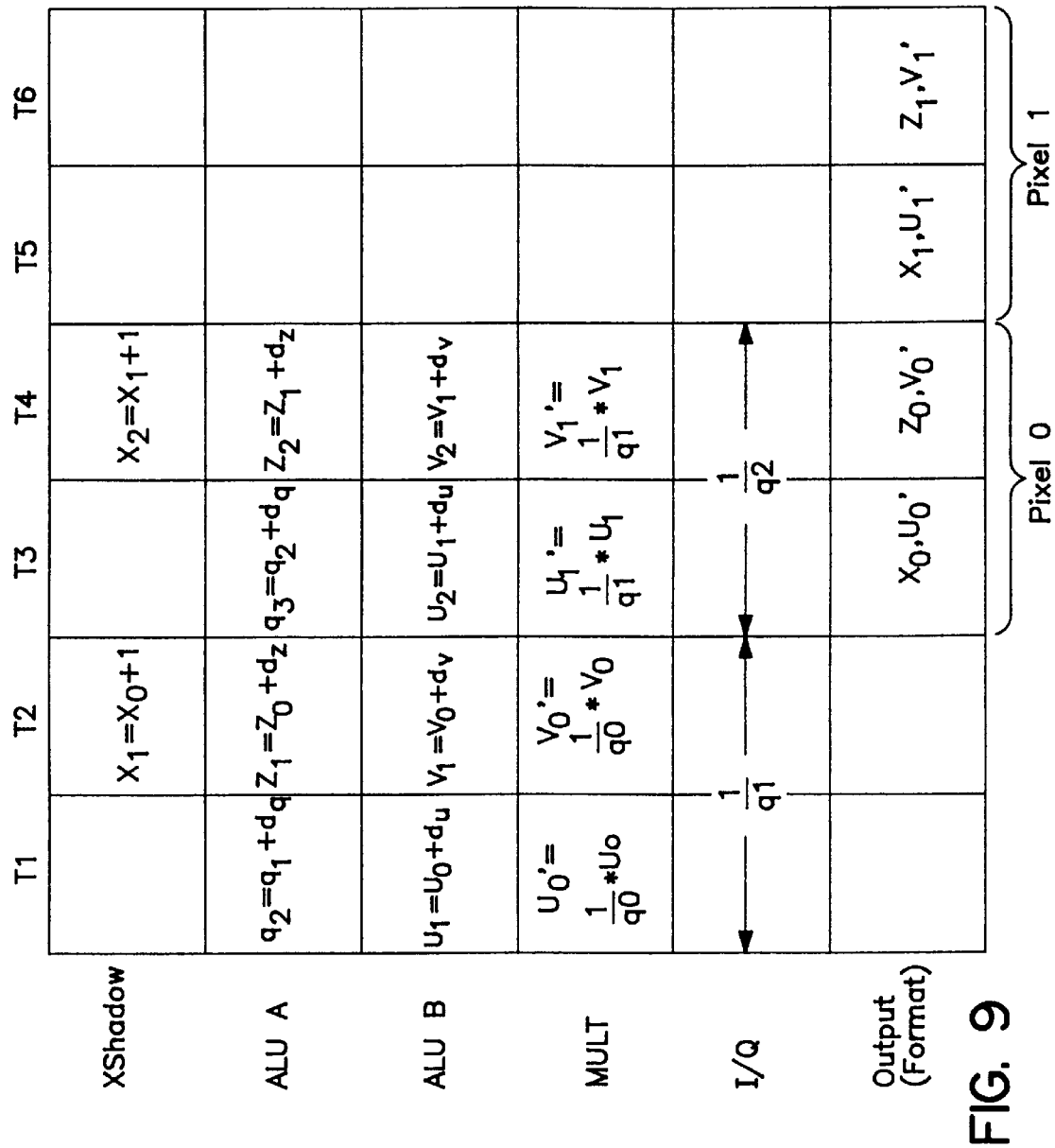
FIG. 9 shows the operation of the data path of FIG. 8 when performing a repeated draw instruction.

When an instruction 159 is received by decode and control unit 160, and instruction 159 is a repeated instruction, decode and control unit 160 prevents program counter 157 from incrementing until the operation specified by the repeated instruction has been performed the number of times specified by the repeated instruction. FIG. 7 shows the basic format of an instruction 159 as comprising an opcode field 220, a destination register field 221, and source register fields 222 and 223. For a "repeated" instruction, the information stored in the opcode field may be considered as including operation information 224 that specifies the operation, repeated information 225 that specifies whether the operation is to be repeated, and number information that specifies the number of times the operation is to be repeated. A processor designer can arbitrarily select any opcode to correspond to a repeated instruction, and distinct operation, repeat, and number fields need not be provided. Furthermore, the number information may alternatively be provided using a separate instruction. For example, an instruction may be used to previously load a register or counter with a value specifying the number of times the operation specified by a repeated instruction is to be repeated FIGS. 8 and 9 show a specific embodiment of the data path 165 that is capable of performing special purpose instructions such as "draw" and "repeated draw" to generate the pixel parameters for the pixels of a span, as well as normal RISC instructions. Data path 165 is shown as including an "even" pipeline having a multiplexer ("MUX") 300, an even register file 302, an Arithmetic Logic Unit ("ALU") A034, and register 306 that outputs sixteen bits of data to an upper data portion 308 of pixel engine instruction 315, which may be stored in a register. Data path 165 also includes an "odd" pipeline that includes multiplexer ("MUX") 301, odd register file 303, an ALU B035, and register 307 that outputs nineteen bits of data to a lower data portion of pixel engine instruction 315. Other functional units of data path 165 include XSHADOW register 311, COUNT register 312, reciprocal calculation circuit ("1/Q") 313, and multiplier 314. Pixel engine instruction 315 also includes an opcode portion 310 that pixel engine 95 reads to determine how to process the data stored in the upper portion 308 and lower portion 309. ALU A304 and ALU B305 each have one clock cycle of latency, and reciprocal calculation circuit 313 and multiplier 314 each have two clock cycles of latency but are pipelined to begin execution of a new operation each dock cycle.

A portion of decode and control circuit 160 is also shown. Specifically, decode instruction register ("decode IR") 405 and CYCLE register 410 are shown as being coupled to provide register addresses for accessing the even and odd register files. According to the present embodiment, decode IR 405 stores the register addresses as decoded from the destination, source 2, and source fields of an instruction, and CYCLE register 410 stores a three-bit cycle count value that specifies the number of clock cycles for each operation of a repeated instruction. According to the present embodiment, each register address is six bits, and the maximum value for cycle count is decoded from the opcode field of the repeated instruction.

For each of the six-bit source register addresses stored in decode IR 405 there is provided a set of three two-input logical OR gates 415 that receive the three least significant bits of the source register addresses and the three-bit cycle count. Each of the logical OR gates 415 perform a logical OR operation with one of the lower bits of the corresponding register address and one of the bits of the cycle count. The cycle count begins at zero and is incremented each clock cycle until the cycle count reaches the predetermined maximum value, whereupon the cycle count is reset to zero, indicating the beginning of the next operation of the repeated instruction. Because the cycle count is incremented each clock cycle, a set of four new source operands (two for each pipeline) are automatically addressed each clock cycle without the need to decode another instruction. By increasing the maximum value of the cycle count, more pixel parameters can be calculated by a draw operation.

Destination register addresses travel through the pipeline with the data. At the end of the pipeline, the destination register address is determined, and the data is written to the indicated register.

Multiplexers 320–325, 330–333, 345–346, 352, and 360–361 are provided for forwarding the results of functional units, as shown, and registers 340–344, 350–351, and 370–371 are provided for pipelining purposes. Both the even and odd pipelines include the following four stages: decode, execute 1 (X1), execute 2 (X2), and write (WR). A fetch stage for both pipelines is performed by instruction memory 155, program counter 157, and decode and control circuit 160 as shown in FIG. 4. Where pertinent, the multiplexers and registers are shown as being controlled/enabled by control signals to output new data at a articular stage of the pipeline for an instruction. For example, register 40 is enabled to pass the operand for a particular instruction during the X1 stage, register 350 is enabled to pass the result for the particular instruction during the X2 stage, and register 370 is enabled pass the same result during the WR stage. All control signals are provided by the decode and control unit 160.

The even and odd pipelines may be used to provide superscalar functionality wherein a first instruction is launched in the. even pipeline and a second instruction is launched in the odd pipeline simultaneously. Furthermore, the even and odd pipelines may be used to perform typical RISC instructions that each specify a single operation by a single functional unit.

The ability to perform special operations such as the "draw" and "repeated draw" instructions is provided, in part, by XSHADOW register 311, COUNT register 312, incrementers ("INC") 380–381, and zero detector circuit (ZD) 390. XSHADOW register 311 stores the current value for the horizontal position parameter "x" during span generation, and incrementer 380 is programmed to store the delta value dx for the span. The COUNT register 312 stores the current value for the counter that specifies the number of draw operations to be performed for a particular "repeated draw" instruction. Incrementer 381 decrements the value of the COUNT whenever a draw operation is completed, which is indicated by the CYCLE register 410 reaching a zero value. When COUNT register 312 stores a zero value, zero detector circuit 390 indicates such to decode and control unit 160 such that decode and control unit 160 can enable the program counter to increment and a new instruction to be fetched.

FIG. 9 shows the operation of data path 165 for performing perspective correction using a "repeated draw" instruction that generates new values for four pixel parameters per draw operation (maximum value of cycle count is equal to two). The "repeated draw" instruction of FIG. 9 performs perspective correction for the u and v parameters by solving the following equations for each draw operation (while COUNT>0):

$$qr = \frac{1}{q} \quad (1)$$

$$u' = qr \times u \quad (2)$$

$$v' = qr \times v \quad (3)$$

$$q = q + dq \quad (4)$$

$$u = u + du \quad (5)$$

$$v = v + dv \quad (6)$$

$$x = x + dx \quad (7)$$

$$z = z + dz \quad (8)$$

Each draw operation outputs the pixel parameters x, z, u', and v', wherein q is the perspective value, dq is the delta value determined for q at setup, u is the horizontal texture coordinate, du is the delta value for u determined at setup, v is the vertical texture coordinate, dv is the delta value for v determined at setup, x is the horizontal position parameter, dx is the delta value for x determined at setup, z is the depth parameter, dz is the delta value for z determined at setup, u' is the perspective corrected value of u, and v' is the perspective corrected value of v. The value of COUNT is decremented once all equations are solved.

The values for q, x, z, u, v, dq, dx, dz, du, and dv are calculated and stored in the register files prior to fetching and decoding the repeated draw instruction. According to the present embodiment, XSHADOW register 311 is loaded with the initial horizontal coordinate x for the span, and incrementer 380 is loaded with the value dx. The values of q and z are stored in the even register file 302 for accessing as the S1A operand, and the values of dq and dz are stored in the even register file 302 for accessing as the S2A operand. Similarly, the values of u and v are stored in the odd register file 303 for accessing as the S1B operand, and the values of du and dv are stored in the odd register file 303 for accessing as the S2B operand.

Data path 165 uses the forwarding capabilities provided by the multiplexers to provide the desired amount of concurrency. As shown in FIG. 9, decode and control unit 160 controls data path 165 at time T1 to solve equations (2), (4), and (5) in parallel for a first pixel (pixel 0) using ALU A304, ALU B305, and multiplier 314, respectively. At time T2, XSHADOW is incremented, solving equation (7), ALU A304 determines equation (8), ALU B305 determines equation (6), multiplier 314 determines equation (3), and reciprocal calculating circuit 313 completes solution of equation (1), which enables the solution of equations (2), (4), and (5) for a second pixel (pixel 1) during time T3. Also at time T3, the values for x and u' ($x_0$ and $u_0'$) for pixel 0 are output. At time T4, the values for z and v' ($z_0$ and $v_0'$) for pixel 0 are output. Also at time T4, equations (1), (3), (6)–(8) are completed for pixel 1, whereupon the parameters for pixel 1 are output during times T5 and T6, as shown. The process continues until COUNT reaches zero.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. In a reduced instruction set computer (RISC) system, an apparatus for performing a computational operation multiple times, comprising:

an instruction memory that stores computer instructions;

a program counter coupled to the instruction memory that indicates an instruction to be executed, wherein the instruction directs the operation;

a decode and control circuit coupled to the instruction memory and to the program counter that decodes the instruction, including an opcode that indicates that the operation is to be performed a number of times, the decode and control circuit causing the program counter to indicate a next instruction when the operation has been performed the number of times; and a data path within a RISC processor including multiple functional units that operate on data in parallel according to the instruction each time the operation is performed, configured to process multiple parameters for a singal pixel.

2. The apparatus of claim 1, wherein when the operation is performed more than once, results of each performance of the operation depend in part upon results of previous performances of the operation.

3. The apparatus of claim 2, wherein the instruction is a draw instruction and the operation includes determining a plurality of pixel parameters from a set of data that characterizes a graphical image to be displayed on a display device of the system.

4. The apparatus of claim 1, wherein the opcode further indicates an instruction type and whether the operation is to be performed more than once.

5. The apparatus of claim 1, wherein the instruction causes multiple functional units of the RISC processor to process data in parallel.

6. In a reduced instruction set computer (RISC) system, an apparatus for performing a computational operation multiple times, comprisin:

means for storing computer instructions;

means for indicating an instruction to be executed, coupled to said means for storing, wherein the instruction directs the operation;

means for decoding the instruction, coupled to said means for indicating, including an opcode that indicates that the operation is to be performed a number of times, the means for decoding causing the means for indicating an instruction to indicate a next instruction when the operation has been performed the number of times; and means for operating on data in parallel according to the instruction each time the operation is performed, configured to process multiple pixel parameters for a single pixel.

* * * * *

UNITED STATES PATENT AND TRADEMARK OFFICE
CERTIFICATE OF CORRECTION

PATENT NO.    : 6,085,310
DATED         : July 4, 2000
INVENTOR(S)   : James Peterson, Glenn C. Poole and Mohammed Sriti It is certified that error appears in the above-identified patent and that said Letters Patent is hereby corrected as shown below:

ABSTRACT,
Line 2, "executes mormal" should read -- executes normal --
Line 5, "unit for each RISC" should read -- unit of the RISC --

Column 10,
Line 67, "times, comprisin:" should read -- times, comprising: --

Signed and Sealed this

Eighth Day of January, 2002

Attest:

JAMES E. ROGAN
Attesting Officer    Director of the United States Patent and Trademark Office